United States Patent [19]
Bocchi

[11] Patent Number: 5,683,541
[45] Date of Patent: Nov. 4, 1997

[54] MACHINE FOR CUTTING AND MOISTENING PLASTIC TUBES

[75] Inventor: Andrea Bocchi, Mirandola, Italy

[73] Assignee: Tecnoideal S.R.L., Mirandola, Italy

[21] Appl. No.: 633,888

[22] Filed: Apr. 17, 1996

[30] Foreign Application Priority Data

Apr. 21, 1995 [IT] Italy ................ BO95A0178

[51] Int. Cl.⁶ ................ B32B 31/00; G05G 15/00
[52] U.S. Cl. ................ 156/350; 156/304.2; 156/353;
156/362; 156/517; 269/13
[58] Field of Search ................ 156/350, 352,
156/353, 362, 365, 158, 159, 304.2, 503,
517, 524; 269/13

[56] References Cited

U.S. PATENT DOCUMENTS

| | | | |
|---|---|---|---|
| 2,012,565 | 8/1935 | Huslander | 156/352 |
| 2,561,019 | 4/1951 | George | 156/352 |
| 3,701,520 | 10/1972 | Pinnolis et al. | 269/13 |
| 4,865,300 | 9/1989 | Borzym | 269/13 |
| 5,279,685 | 1/1994 | Ivansons et al. | 156/350 X |

*Primary Examiner*—David A. Simmons
*Assistant Examiner*—Paul M. Rivard
*Attorney, Agent, or Firm*—Ladas & Parry

[57] ABSTRACT

A machine for cutting and moistening plastic tubes, and presenting: a reel about which the tube is wound; a feed device for feeding the tube in a given direction; a cutting device for cutting the tube to define a portion; and a dispensing device for dispensing adhesive on to an end of the portion. The machine also presents a gripping device for gripping the portion during cutting, and for conveying the portion to the dispensing device; and a detecting device which, following dispensing of the adhesive, detects the presence of the operator's hand gripping the portion, and de-activates the gripping device to release the portion into the operator's hand.

7 Claims, 2 Drawing Sheets

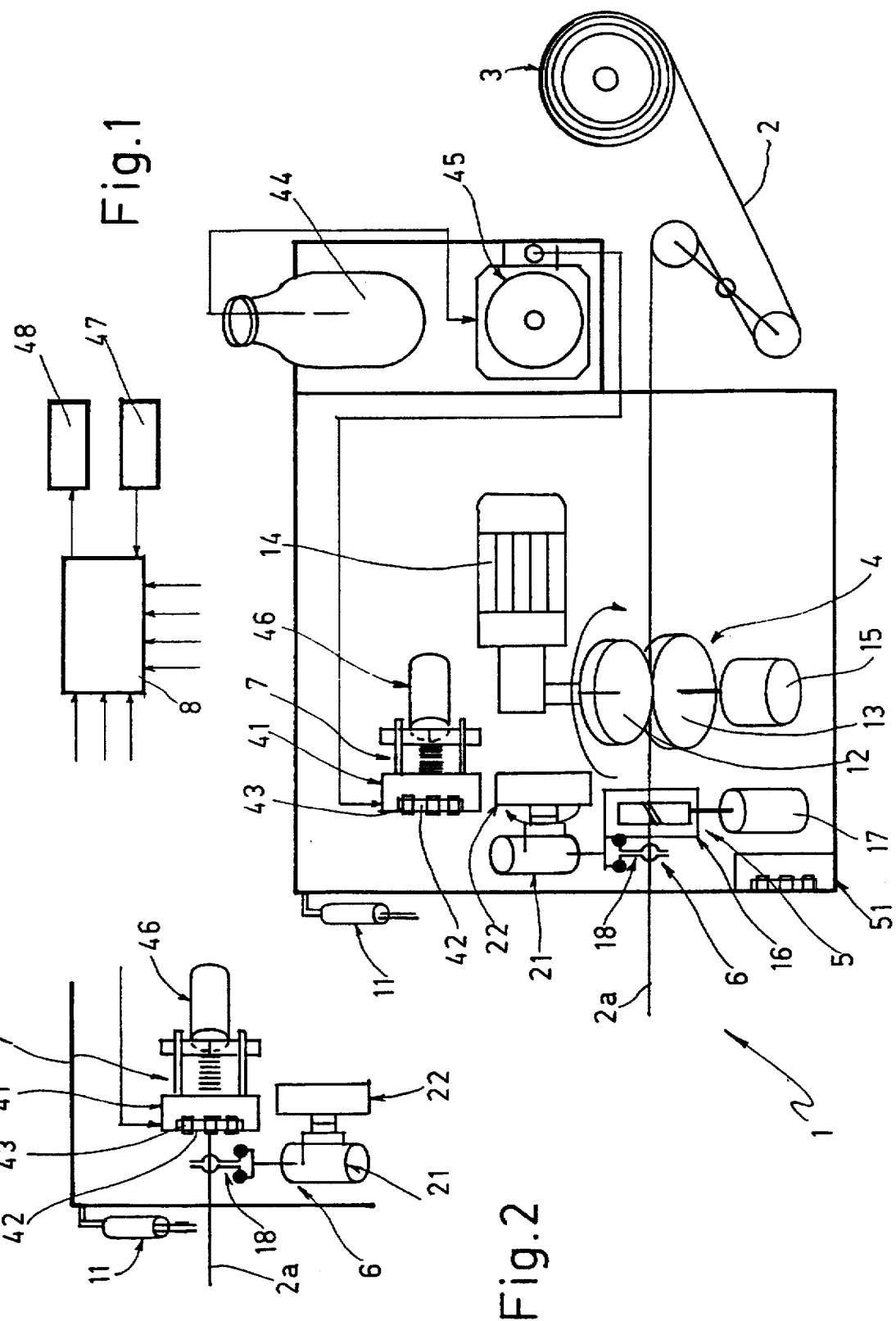

MACHINE FOR CUTTING AND MOISTENING PLASTIC TUBES

BACKGROUND OF THE INVENTION

The present invention relates to a machine for cutting and moistening plastic tubes, in particular, tubes for fitment to medical equipment.

As is known, to make hydraulic circuits from plastic tubes for certain equipment, the tube is cut to given lengths, the ends of the tube portions are moistened with solvent (adhesive), and the tube portions are connected to other members of the circuit such as fittings, valves, etc.

At present, the market caters for machines for cutting the tube, and machines for dispensing the solvent on to the ends of the tube portions, for which purpose, the operator fits the end of the tube portion inside a bush of a dispensing member of the dispensing machine.

SUMMARY OF THE INVENTION

It is an object of the present invention to provide a machine for cutting and moistening plastic tubes, designed to perform both the above operations.

Further objects and advantages of the present invention will be disclosed in the following description.

According to the present invention, there is provided a machine for cutting and moistening plastic tubes, the machine comprising:

a reel about which said tube is wound;

feeding means for unwinding said tube off said reel and feeding said tube in a given direction;

a cutting device for cutting said tube to define a portion of said tube; and a dispensing device for dispensing adhesive on to an end of said portion;

characterized by comprising gripping means for gripping said portion during cutting, and for conveying said portion to said dispensing device; and detecting means which, following the dispensing of said adhesive, detect the presence of an operator's hand gripping said portion, and de-activate said gripping means to release said portion into the operator's hand.

BRIEF DESCRIPTION OF THE DRAWINGS

A preferred non-limiting embodiment of the present invention will be described by way of example with reference to the accompanying drawings, in which:

FIG. 1 shows a block diagram of a machine in accordance with the teachings of the present invention;

FIG. 2 shows a schematic view of a member of the FIG. 1 machine at a different operating step;

DETAILED DESCRIPTION OF THE INVENTION

Figure 3:
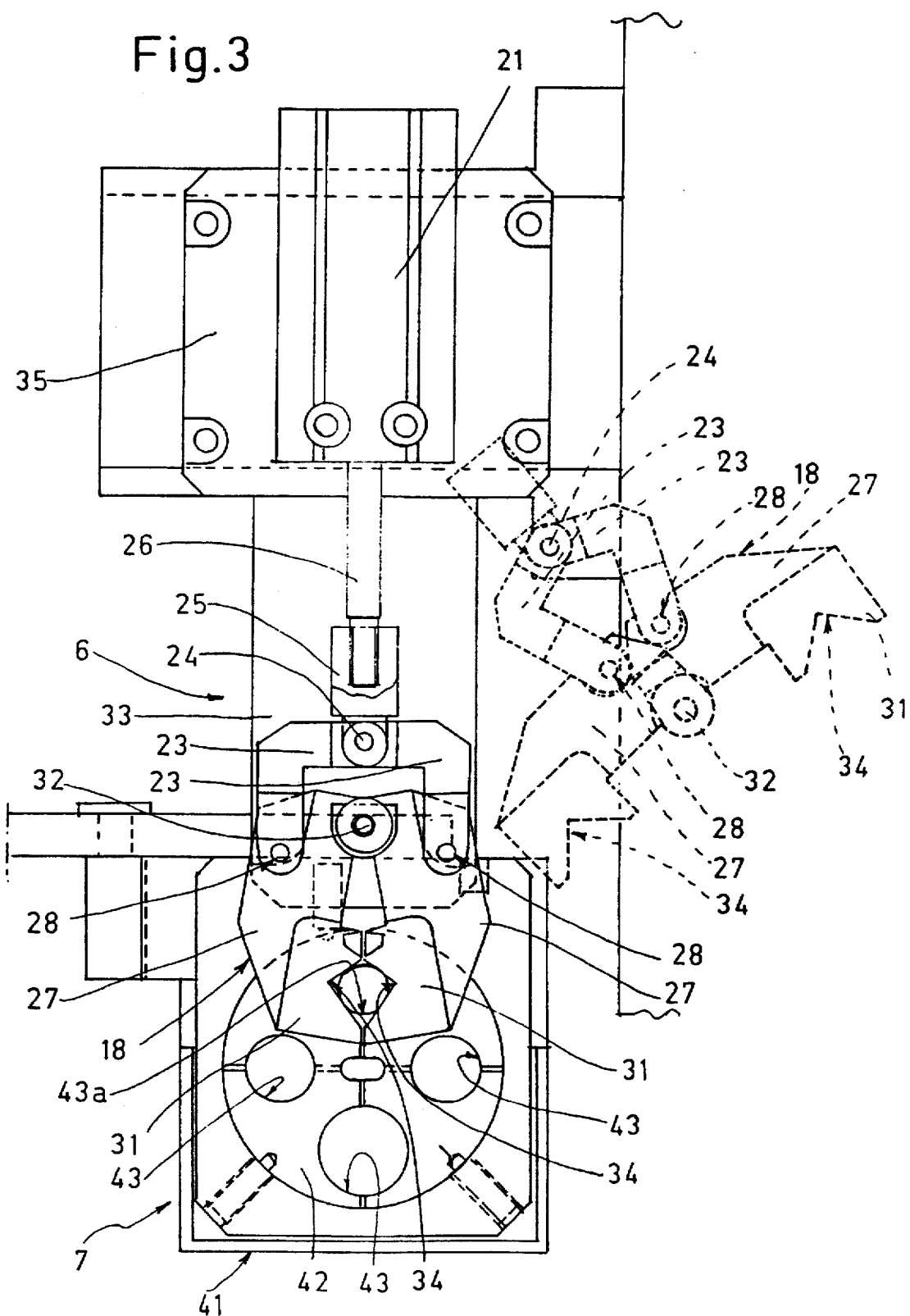
FIG. 3 shows a front view of the FIG. 2 member.

Number 1 in FIG. 1 indicates a machine for cutting and moistening plastic tubes 2, in particular tubes for fitment to medical equipment. Machine 1 provides for cutting tube 2 into predetermined lengths, and for moistening the ends of the resulting tube portions with solvent (adhesive) to enable the operator to connect the tube portions to other members of a hydraulic circuit, such as fittings, valves, etc.

Machine 1 comprises:

a reel 3 about which tube 2 is wound;

means 4 for unwinding tube 2 off reel 3 and feeding tube 2 in a given direction;

a cutting device 5 for cutting tube 2 to define a portion 2a of tube 2;

means 6 for gripping portion 2a;

a device 7 for dispensing adhesive on to an end of portion 2a still gripped by means 6;

an electronic control unit 8 for controlling machine 1; and means 11 connected to control unit 8 and for detecting the presence of the operator's hand in the vicinity of device 7.

With reference to FIG. 1, means 4 comprise:

a first wheel 12 rotating about a horizontal axis;

a second wheel 13 rotating about a horizontal axis parallel to the axis of wheel 12; wheels 12 and 13 being located close to each other in the same vertical plane so that their respective cylindrical surfaces define a passage for tube 2;

a motor 14 controlled by control unit 8 and in turn controlling rotation of wheel 12; and a sensor 15 (e.g. comprising an encoder) connected to control unit 8 and for detecting the turns made by wheel 13.

Tube 2 off reel 3 is fed between wheels 12 and 13, which are respectively drive and driven wheels; and the width of the passage defined between wheels 12 and 13 is less than the outside diameter of tube 2, so that tube 2 is pressed between wheels 12 and 13 and, in addition to transmitting motion from wheel 12 to wheel 13, is also unwound off reel 3.

With reference to FIG. 1, device 5 comprises a known cutting member 16, e.g. comprising two plates with respective blades, and a hydraulic actuator 17 controlled by control unit 8 and for moving one plate against the other to cut tube 2.

With reference to FIGS. 1, 2 and 3, means 6 comprise:

a gripper 18 for gripping portion 2a;

a hydraulic actuator 21 controlled by control unit 8 and for moving gripper 18 between a gripping position (shown by the continuous line in FIG. 3) and a release position (shown by the dotted line in FIG. 3); and a hydraulic actuator 22 controlled by control unit 8 and for controlling the angular position of gripper 18 between a position wherein the gripping members of gripper 18 are located at cutting device 5 (FIG. 1), and a position wherein the gripping members of gripper 18 are located at dispensing device 7 (FIG. 2).

With reference to FIG. 3, gripper 18 comprises two upside down L-shaped levers 23 symmetrical with each other in relation to the longitudinal axis of a rod 26 of actuator 21, and which are hinged at the top end to the same pin 24 fitted to a block 25 in turn fitted to the end of rod 26. Gripper 18 also comprises a further two levers 27 symmetrical with each other in relation to said axis of rod 26. Each lever 27 is substantially defined by a respective flat plate presenting an edge outside the gripping region and at which is formed a hinge 28 for hinging lever 27 to a respective lever 23, and an edge within the gripping region and outwards of which lever 27 is fitted with a respective gripping member 31, and inwards of which there is formed a hinge for hinging both levers 27 to the same pin 32 fitted to a fixed plate 33. The axial movement of rod 26 rotates levers 23 about pin 24, and levers 27 about pin 32. Each gripping member 31 is defined by a respective body in which is formed a V-shaped recess 34; and, when gripper 18 is in the gripping position, members 31 are positioned adjacent to each other so that recesses 34 define a seat for clamping portion 2a. Plate 33 is connected to a second plate 35 supporting actuator 21, and which is rotated by actuator 22 about a horizontal axis to set gripper 18 to said angular positions. Motion may be transmitted between actuator 22 and plate 35 by means of a known mechanism, such as a rack.

With reference to FIGS. 1, 2 and 3, device 7 comprises a dispenser body 41 presenting a disk 42 in turn presenting a number of seats 43, which are engaged by one end of portion 2a, and which differ in design for selectively moistening the inside or outside of portion 2a, and in size for adapting to the diameter of tube 2. Dispenser body 41 is associated with a solvent reservoir 44, and a pump 45 controlled by control unit 8 and for feeding solvent to one of seats 43. By means of a hydraulic actuator 46 controlled by control unit 8, dispenser body 41 is movable between an idle position (FIG. 1) and a work position (FIG. 2); and control unit 8 is connected to a keyboard 47 for entering data, and to a display 48 for displaying the entered data and that processed by control unit 8.

In actual use, the length of portion 2a and the number of portions 2a to be cut are entered on keyboard 47. Depending on the diameter of tube 2 and the type of moistening (internal or external), the corresponding seat 43 is selected, and disk 42 is positioned angularly so that the selected seat 43 is set to a given position in relation to dispenser body 41 and as indicated in FIG. 3 by seat 43a. At this point, control unit 8 operates means 4 to feed tube 2 up to device 5 and into a start position, as of which, control unit 8 feeds tube 2 beyond device 5, determines the length of the portion of tube 2 downstream from device 5 by means of sensor 15, and, once the selected length is reached, de-activates means 4 and activates device 5 to cut tube 2 into a portion 2a. Before tube 2 is cut, control unit 8 operates means 6 to grip the portion of tube 2 extending beyond device 5, and, after tube 2 is cut, control unit 8 rotates means 6 from the position adjacent to device 5 to the position adjacent to device 7. Once means 6 are so positioned, control unit 8 moves dispenser body 41 from the idle to the work position wherein the end of portion 2a engages the selected seat 43, and operates pump 45 to moisten the end of portion 2a with solvent inside the selected seat 43. Once moistened, portion 2a is gripped by the operator who, in so doing, enters the field of operation of means 11, which transmit a signal to control unit 8 to switch gripper 18 to the release position; at which point, portion 2a is released into the operator's hand and connected by the operator to the hydraulic circuit members.

The advantages of the present invention will be clear from the foregoing description.

In particular, it provides for a machine for automatically cutting the tube, moistening the tube portion, and releasing the moistened tube portion when this is gripped by the operator; for programming the length and number of tube portions to be produced; and for selecting the moistening seat as a function of the tube diameter and type of moistening required (internal or external). The machine may also be equipped with a second dispenser body 51, substantially similar to body 41, for enabling the operator to moisten the end of portion 2a not moistened by body 41. To do this, as tube 2 is fed forward, the operator grips and bends the downstream portion of the tube to insert the end of portion 2a for moistening inside a seat on body 51. Also to be stressed is the extremely straightforward design of the machine.

Clearly, changes may be made to machine 1 as described and illustrated herein without, however, departing from the scope of the present invention.

In particular, means 11 may comprise a proximity sensor, a photocell sensor, or any other type of sensor capable of detecting the operator's hand gripping portion 2a.

I claim:

1. A machine for cutting and moistening plastic tubes, the machine comprising:

a reel about which said tube is wound;

feeding means for unwinding said tube off said reel and feeding said tube in a given direction;

a cutting device for cutting said tube to define a portion of said tube; and a dispensing device for dispensing adhesive on to an end of said portion;

characterized by comprising gripping means for gripping said portion during cutting, and for conveying said portion to said dispensing device; and detecting means which, following the dispensing of said adhesive, detect the presence of an operator's hand gripping said portion, and de-activate said gripping means to release said portion into the operator's hand.

2. A machine as claimed in claim 1, characterized by comprising an electronic control unit to which said detecting means are connected, and which controls said feeding means, said cutting device, said dispensing device and said gripping means.

3. A machine as claimed in claim 2, characterized by comprising, connected to said control unit, a keyboard for entering data such as the length and number of said portions, and a display for displaying entered data and the data processed by said control unit.

4. A machine as claimed in claim 1, characterized in that said gripping means comprise:

a gripper for gripping said portion;

a first hydraulic actuator controlled by said control unit and for moving said gripper between a gripping position wherein said portion is gripped, and a release position wherein said portion is released; and a second hydraulic actuator controlled by said control unit and for controlling the angular position of said gripper between a position wherein the gripping members of said gripper are located at said cutting device, and a position wherein the gripping members of said gripper are located at said dispensing device.

5. A machine as claimed in claim 4, characterized in that said dispensing device comprises a dispenser body presenting at least one seat which is engaged by an end of said portion, and in which said adhesive is dispensed; and a third hydraulic actuator controlled by said control unit and for moving said dispenser body between an idle position and a work position wherein said seat is engaged by the end for moistening of said portion.

6. A machine as claimed in claim 5, characterized in that said dispenser body comprises a number of said seats differing in form to receive a corresponding diameter of said portion, and differing as to the type of moistening, so as to selectively coat said portion internally or externally.

7. A machine as claimed in claim 1, characterized by comprising a second dispenser body used by the operator to moisten the end of said portion not moistened by said dispensing device.

\* \* \* \* \*